(12) United States Patent
Murphy (10) Patent No.: US 10,507,855 B2
(45) Date of Patent: Dec. 17, 2019

(54) HAND TRUCK (71) Applicant: TM-Logic LLC, Sterling, VA (US)

(72) Inventor: Jerry Murphy, Mesa, AZ (US)

(73) Assignee: TM-Logic LLC, Sterling, VA (US)

(*) Notice: Subject to any disclaimer, the term of this patent is extended or adjusted under 35 U.S.C. 154(b) by 149 days.

(21) Appl. No.: 15/671,470

(22) Filed: Aug. 8, 2017

(65) Prior Publication Data
US 2019/0047601 A1  Feb. 14, 2019

(51) Int. Cl.
| | | |
|---|---|---|
| *B62B 1/14* | (2006.01) | |
| *B62B 1/06* | (2006.01) | |
| *B62B 1/18* | (2006.01) | |
| *B62B 5/00* | (2006.01) | |
| *B62B 1/12* | (2006.01) | |
| *B62B 1/00* | (2006.01) | |
| *B62B 3/02* | (2006.01) | |

(52) U.S. Cl.
CPC .............. *B62B 1/14* (2013.01); *B62B 1/002* (2013.01); *B62B 1/06* (2013.01); *B62B 1/12* (2013.01); *B62B 1/18* (2013.01); *B62B 3/02* (2013.01); *B62B 5/0053* (2013.01); *B62B 5/00* (2013.01); *B62B 5/005* (2013.01); *B62B 2203/10* (2013.01)

(58) Field of Classification Search
CPC ........... B62B 1/12; B62B 5/0053; B62B 1/14; B62B 1/06; B62B 1/08
See application file for complete search history.

(56) References Cited

U.S. PATENT DOCUMENTS

| | | |
|---|---|---|
| 507,483 A | 10/1893 | Cardarelli |
| 1,986,620 A | 1/1935 | Borden et al. |
| 2,598,489 A | 5/1952 | Bayer et al. |
| 2,688,881 A | 9/1954 | Crossland |
| 2,895,567 A | 7/1959 | Hall |
| 2,904,201 A | 9/1959 | Rhodes |
| 3,052,323 A | 9/1962 | Hopfeld |
| 3,156,315 A | 11/1964 | Hawgood |
| 3,907,138 A | 9/1975 | Rhodes |
| 3,921,958 A | 11/1975 | Brockelsby et al. |
| 4,049,083 A | 9/1977 | Garvey |
| 4,722,658 A | 2/1988 | Wurtz et al. |
| 4,728,245 A | 3/1988 | Shelton |
| 4,756,540 A | 7/1988 | Crawford |
| 5,017,080 A | 5/1991 | Thorndike et al. |
| 5,029,884 A | 7/1991 | Maendel |

(Continued)

FOREIGN PATENT DOCUMENTS

JP     2005075248     3/2005

OTHER PUBLICATIONS

Machine Translation of JP2005075248.

*Primary Examiner* — Kaitlin S Joerger
(74) *Attorney, Agent, or Firm* — Woodard, Emhardt, Henry, Reeves & Wagner, LLP (57) ABSTRACT

Hand trucks having a powered lifting assembly are disclosed. In certain aspects, hand trucks having a motor assembly and a battery pack mount arranged to removably receive a battery pack arranged for a portable tool are disclosed. Hand trucks having a pivoting rearward support are also disclosed, with particular arrangements advantageously pivoting the rearward support upwardly as it is configured into the retracted configuration so as to lift wheels of the rearward support above other wheels of the hand truck.

18 Claims, 8 Drawing Sheets

(56) References Cited

U.S. PATENT DOCUMENTS

| | | | |
|---|---|---|---|
| 5,207,550 A | 5/1993 | Lehman | |
| 5,228,716 A | 7/1993 | Dahl | |
| 5,252,022 A | 10/1993 | Culp et al. | |
| 5,344,278 A | 9/1994 | Emig, Jr. | |
| 5,372,470 A | 12/1994 | Wilke et al. | |
| 5,379,814 A | 1/1995 | Posly | |
| 6,302,377 B1 | 10/2001 | Pimentel | |
| 6,398,477 B1 | 6/2002 | Fox | |
| 6,406,248 B1 | 6/2002 | McGill et al. | |
| 6,530,740 B2 | 3/2003 | Kim | |
| 6,561,745 B2 | 5/2003 | Rountree | |
| 6,929,443 B1 | 8/2005 | Nellis | |
| 6,971,654 B2 | 12/2005 | Amsili | |
| 7,137,464 B2 * | 11/2006 | Stahler, Sr. | B62B 5/023 180/8.2 |
| 7,712,582 B2 | 5/2010 | Burton et al. | |
| 7,841,603 B2 * | 11/2010 | White | B62B 1/125 280/47.29 |
| 7,914,017 B2 * | 3/2011 | Setzer, Sr. | B62B 1/10 280/47.17 |
| 8,465,046 B2 * | 6/2013 | Meyers | B62B 1/002 280/30 |
| 8,851,215 B2 * | 10/2014 | Goto | B62M 6/55 180/65.1 |
| 9,120,657 B1 * | 9/2015 | Turner | B62B 1/10 |
| 9,150,233 B2 * | 10/2015 | Su | B62B 3/022 |
| 9,282,695 B2 * | 3/2016 | Goto | B62M 6/55 |
| 9,321,471 B1 * | 4/2016 | Gedeon-Janvier | B62B 1/002 |
| 9,969,411 B2 * | 5/2018 | Belotti | B62B 5/06 |
| 2001/0038786 A1 | 11/2001 | Kim | |
| 2002/0134970 A1 | 9/2002 | Bressner et al. | |
| 2003/0049116 A1 | 3/2003 | Henning | |
| 2004/0076501 A1 | 4/2004 | McGill et al. | |
| 2005/0110232 A1 | 5/2005 | DiBenedetto | |
| 2005/0169736 A1 | 8/2005 | Decky | |
| 2007/0152413 A1 | 7/2007 | White | |
| 2008/0054581 A1 * | 3/2008 | Voth | B62B 1/08 280/40 |
| 2009/0285659 A1 | 11/2009 | Wilson | |
| 2011/0130865 A1 * | 6/2011 | Setzer, Sr. | B66F 9/08 700/213 |
| 2011/0243696 A1 | 10/2011 | DiBenedetto | |
| 2012/0055122 A1 | 3/2012 | Beauchamp | |
| 2012/0207571 A1 | 8/2012 | Scott | |
| 2012/0242063 A1 * | 9/2012 | Bruckner | B62B 1/002 280/651 |
| 2012/0286483 A1 | 11/2012 | Fluet-Howrish | |
| 2013/0121795 A1 | 5/2013 | Le | |
| 2013/0181418 A1 | 7/2013 | Burton et al. | |
| 2013/0270785 A1 * | 10/2013 | Whinnery | B62B 1/12 280/47.29 |
| 2013/0302120 A1 * | 11/2013 | Murphy | B62B 1/12 414/471 |
| 2016/0236699 A1 * | 8/2016 | Wang | B62B 3/02 |

* cited by examiner

HAND TRUCK

BACKGROUND

The present invention pertains to hand trucks, in particular, hand trucks having a powered lifting/lowering feature. Hand trucks are well known devices used for the manual transportation of heavy loads from one location to another location. The most common hand truck has a generally L-shaped body with wheels at the vertex of the L-shaped body and at least one handle located either around a midpoint of the L-shape or near the top of the L-shape. The short leg of the L-shape is the load bearing portion of the hand truck, with the short leg typically level with a support surface when the hand truck is upright. An object to be moved is tilted forward, the short leg is inserted underneath such object, the object is then allowed to tilt back and rest on the short leg. Then the hand truck, with the supported object, is tilted backward until the center of gravity of the combination is generally balanced over the wheels, making otherwise bulky and heavy objects easier to move.

Improvements to such hand-propelled vehicles have been developed over the years. One improvement relates to providing powered lifting, lowering and transporting features. For example, U.S. Patent Publication No. 2013/0302120 to Murphy, published Nov. 14, 2013, discloses a hand truck having a gearbox driveable using a power supply supplied by a user.

There is, however, a continued need for new and improved handtrucks. Such improved handtrucks can improve service speed and efficiency, and can reduce the risks of back and other injury by operators.

SUMMARY

Hand trucks having a powered lifting assembly are disclosed as well as hand trucks having a pivoting rearward support. In certain aspects, hand trucks having a motor assembly and a battery pack mount arranged to removably receive a battery pack arranged for a portable tool are disclosed. In some particular arrangements, a rearward support pivots upwardly as it is configured into a retracted configuration so as to lift wheels of the rearward support above other wheels of the hand truck.

In some instances, the present disclosure provides hand trucks, comprising a frame having a first end and a second end; a wheel assembly attached to the first end of the frame and including at least two wheels; a lifting platform moveable along a length of the frame between the first end and the second end; a motor assembly arranged to move the lifting platform along the frame; and a battery pack mount arranged to removably receive a separate battery pack arranged for a portable tool and transfer power from the battery pack to the motor assembly.

The battery pack mount can be arranged to receive a battery pack adapted for a portable drill. In some instances, the hand truck is provided with a battery pack, such as one adapted for a portable drill.

At least one of the battery pack and the battery pack mount can have a latch arranged to engage the other of the battery pack and the battery pack mount. The latch can be configured to selectively lock the battery pack to the battery pack mount.

In some instances, the battery pack mount is positioned on the motor assembly. The battery pack mount is not a portion of a hand drill or other power tool.

The motor assembly can be coupled to the lifting platform and travel with the lifting platform when the lifting platform moves along the frame. In many instances, the motor assembly is rotationally coupled to a portion of the hand truck, such as the lifting platform, the frame, and/or an elongated gearing system. Accordingly, no external mechanical force acting on the motor assembly is required for the motor assembly to move the lifting platform as the moment (e.g., rotational force) observed by the motor assembly during operation is counteracted by another portion of the hand truck.

In some instances, the motor assembly includes a wireless communication module.

The hand truck can include an elongated gearing system extending at least partially between the first end of the frame and the second end of the frame; wherein the motor assembly engages to the elongated gearing system to move the lifting platform along the frame.

In the described hand trucks, the hand truck may include a rearward support configurable between an extended configuration and a retracted configuration and having a downward extending support leg; and an intermediate member extending from the frame to the rearward support member and having a first end pivotably coupled to the frame and a second end pivotably coupled to the rearward support. For example, in at least one embodiment, the hand truck comprises a frame having a first end, a second end, a left frame member, a right frame member, and defining a plane; a wheel assembly attached to the first end of the frame; a lifting platform; a rearward support configurable between an extended configuration and a retracted configuration and having a downward extending support leg; and an intermediate member extending from the frame to the rearward support member and having a first end pivotably coupled to the frame and a second end pivotably coupled to the rearward support; wherein a upper portion of the downward extending support leg is slidable and pivotable relative to the frame.

The downward extending support leg can be in-plane with the frame in the retracted configuration. Additionally or alternatively, the downward extending support leg can be nested within a portion of the frame in the retracted configuration.

In some instances, the hand truck includes a locking member arranged to slidably lock the rearward support relative to the frame.

In some arrangements, the upper portion of the downward extending support leg is closer to the second end of the frame in the retracted configuration than in the extended configuration.

Further forms, objects, features, aspects, benefits, advantages, and embodiments of the present invention will become apparent from a detailed description and drawings provided herewith.

DESCRIPTION OF THE SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Figure 1:
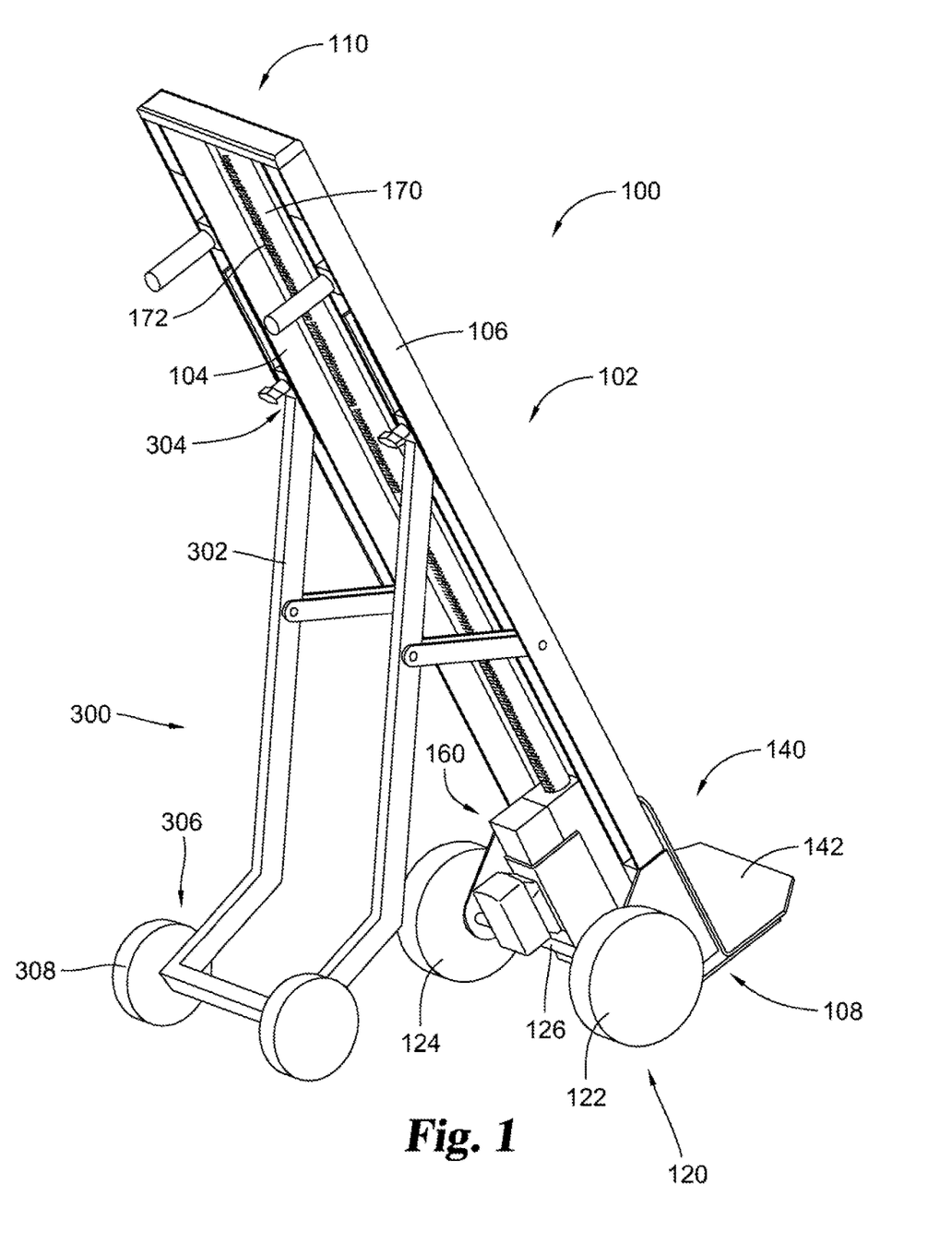
FIG. 1 illustrates a perspective view of an exemplary hand truck of the present disclosure.
Figure 2:
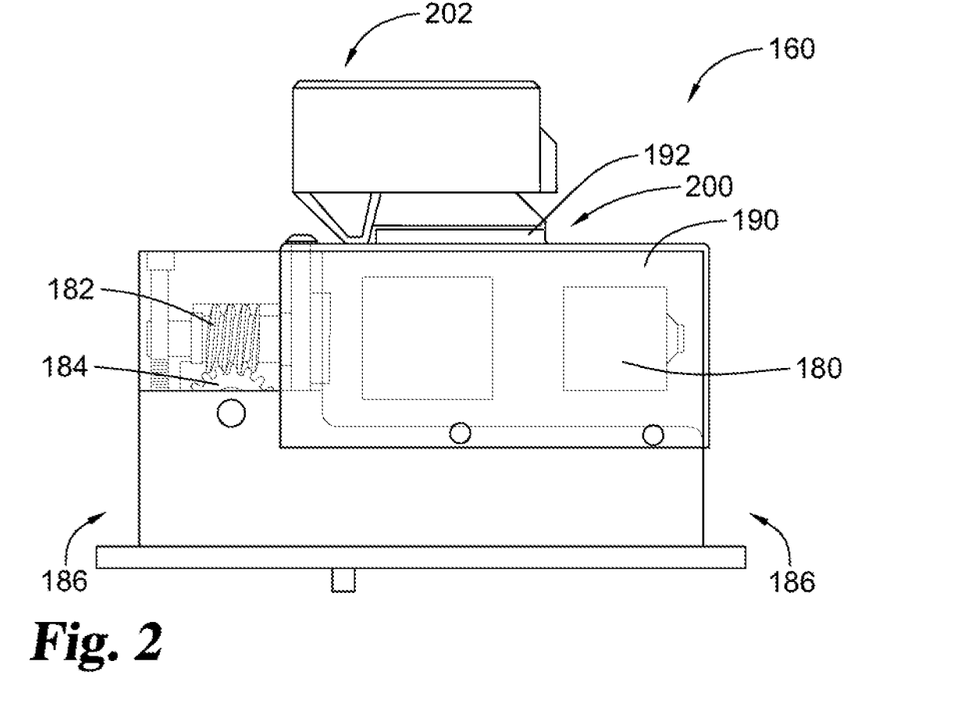
FIG. 2 illustrates a side view of a motor assembly and battery pack of FIG. 1, with a wall of the motor assembly illustrated transparently so as to show working components of the motor assembly.
Figure 3:
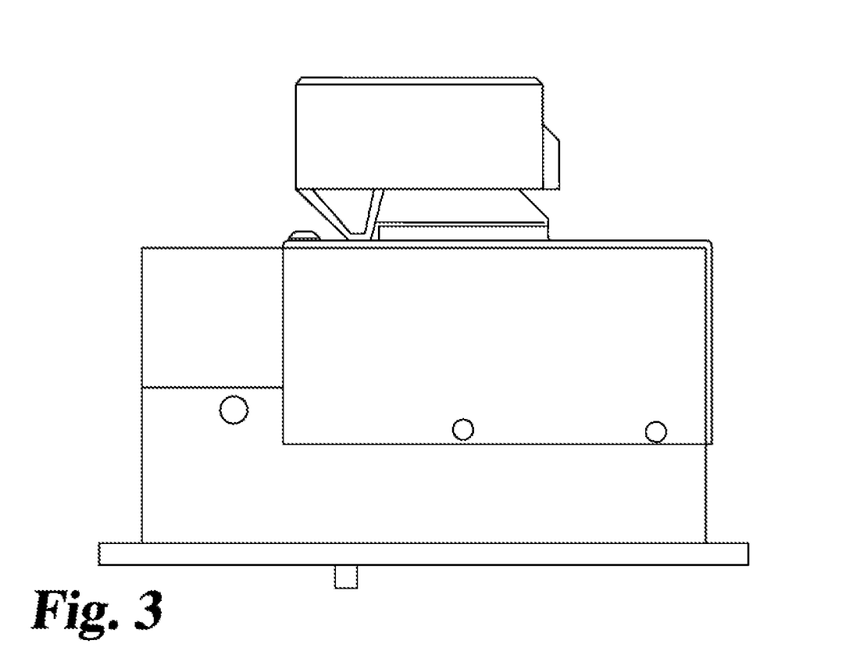
FIG. 3 illustrates a side view of the motor assembly battery of FIGS. 1 and 2 without the wall the motor assembly being transparent.

As illustrated in FIG. 1, a hand truck 100 of the present disclosure includes a frame 102 having a left frame member 104, a right frame member 106, and extending from a first end 108 (e.g., bottom end), to a second end 110 (e.g., top end). Attached to the first end of the frame is a wheel assembly 120 which includes, in some embodiments, a first wheel 122, a second wheel 124, and an axle 126.

A lifting assembly 140 is associated with the frame and arranged to move a lifting platform 142 along a length of the frame between the first end 108 and the second end 110. The lifting platform may be replaceable and/or removable from hand truck 100. In some instances, one or more lifting platforms may be provided with the hand truck. Such lifting platforms may vary from one another, having arrangements to complement specific items to be lifted by the hand truck. For example, some lifting platforms may have a horizontal lifting plate arranged to support an item from underneath and other lifting platforms may, additionally or alternatively, include one or more lift cradles, such as arcuate bumpers, arranged to receive the side of a water heater. Lifting assemblies and platforms described in U.S. Patent Publication No. 2013/0302120 to Jerry Murphy which published on Nov. 14, 2013, are hereby incorporated by reference. However, unless expressly recited otherwise, the present hand truck has a motor assembly without a separate motor tool such as a separate electric drill.

Included in the hand truck is a motor assembly 160 arranged to move the lifting platform along a length of the frame. In many instances, the motor assembly is coupled to the lifting platform and travels with the lifting platform as the lifting platform moves along the frame.

In the illustrated embodiment, an elongated gearing system 170 extends at least partially between the first end and the second end of the frame. The elongated gearing system includes teeth 172 that are engaged by the motor assembly during operation so as to move the lifting platform along the frame. For example, as illustrated in FIGS. 2-5, the motor assembly may include a motor 180 connected to a worm gear 182 which, when rotated by the motor, rotates a spur gear 184. When the elongated gearing system is received through an opening 186 in the motor assembly, the teeth of the spur gear can engage the teeth of the elongated gearing system so as to move the motor assembly along the elongated gearing system. It will be appreciated, however, that other arrangements are envisioned. For example, worm gear 182 may be arranged to engage directly with teeth 172 of elongated gearing system 170.

Alternatively, instead of (or in addition to) an elongated gearing system, a tensile system such as a cable or belt or chain, (e.g. bicycle type chain), wound and unwound on a spool, (rotated by the motor), or a cable pulled through a motorized gear or other advancer, may be used to move the lifting platform along the frame. Another alternative may be a pump activated by the motor with the pump lifting the platform with hydraulics.

In some embodiments, the motor assembly includes a motor housing 190 and/or electronics, such as a motor control board 192. In some instances, electronics contained within the motor assembly are arranged for wireless communication. For example, the motor control board may include a wireless communication module (e.g. an RF receiver) for receiving a wireless signal and/or arranged for transmitting a wireless signal (e.g., an RF transmitter and/or RF transceiver). The wireless communication module may communicate with a motor control module so as to allow wireless control of motor direction and/or speed.

The handtruck includes at least one battery pack mount 200 arranged to removably receive at least one battery pack 202. The battery pack mount includes electrical contacts 206 arranged to electrically connect the battery pack with the motor and/or motor control electronics. In some instances, at least one of the battery packs and the battery pack mounts has a latch arranged to engage the other of the battery pack and the battery pack mount. That latch can be configured to selectively lock the battery pack to the battery pack mount. For example, battery pack mount 200 may include a latch 210 arranged to engage battery pack 202 when the battery pack is positioned on the battery pack mount. Advantageously, locking the battery pack to the battery pack mount can aid in maintaining electrical connection between the battery pack and the electrical contacts of the battery pack mount.

Figure 4:
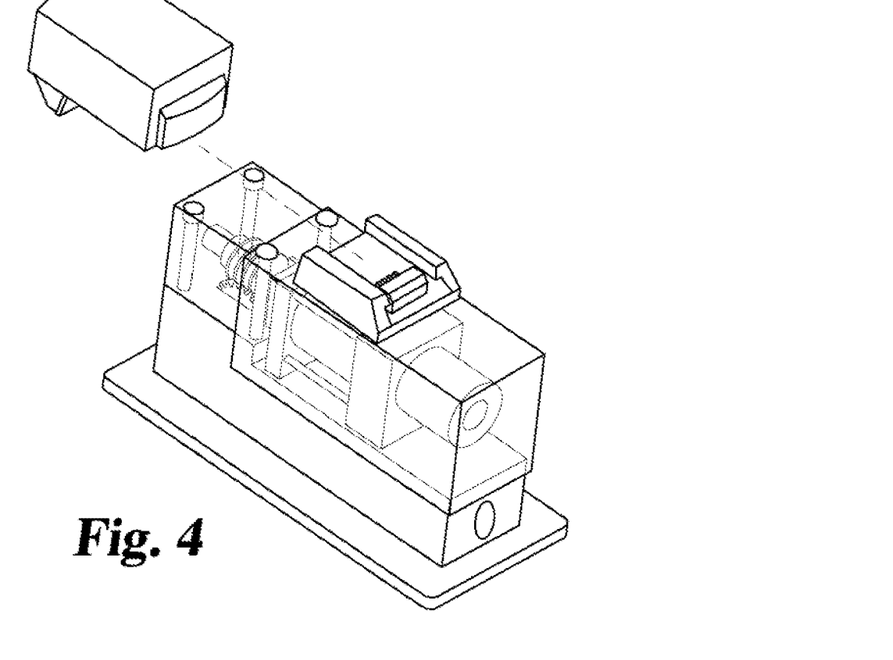
FIGS. 4 and 5 illustrate a perspective view of the battery pack and motor assembly of FIGS. 1-3.
Figure 5:
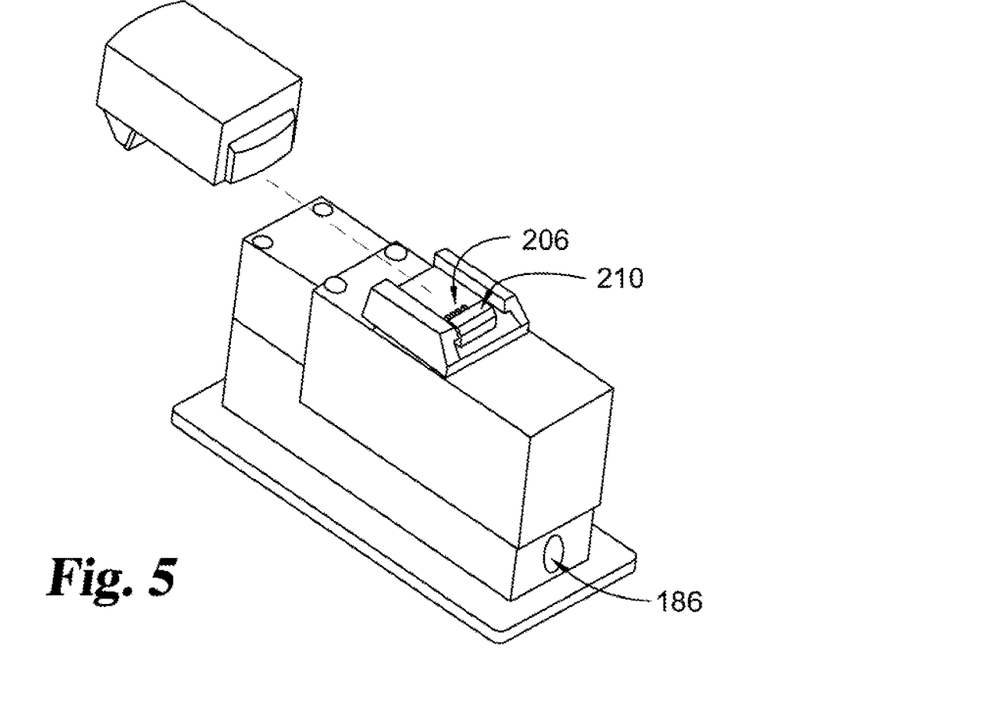
Figure 6:
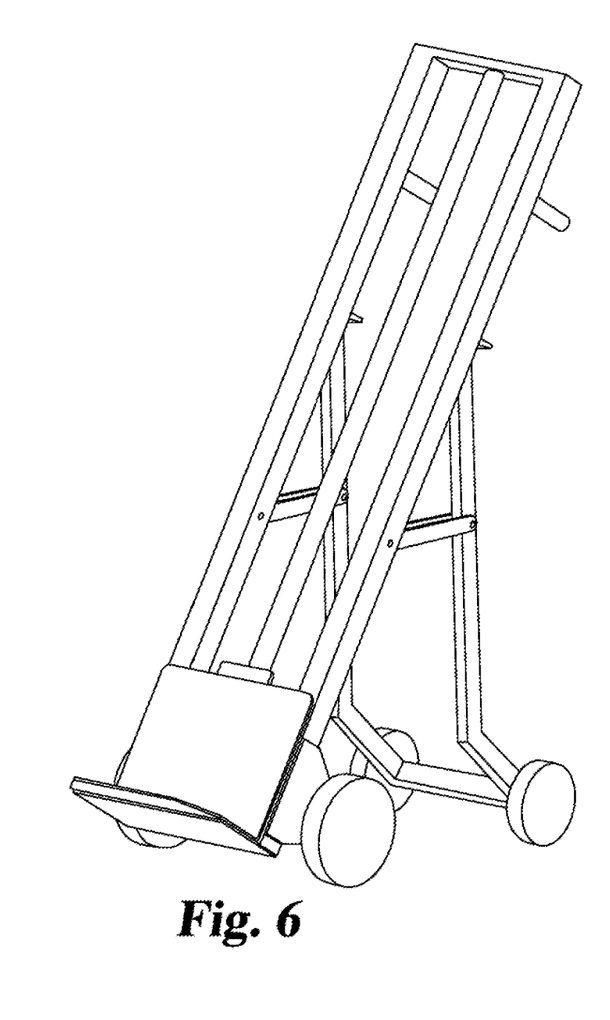
FIGS. 6 and 7 illustrate an exemplary use of the hand truck illustrated in FIG. 1.
Figure 7:
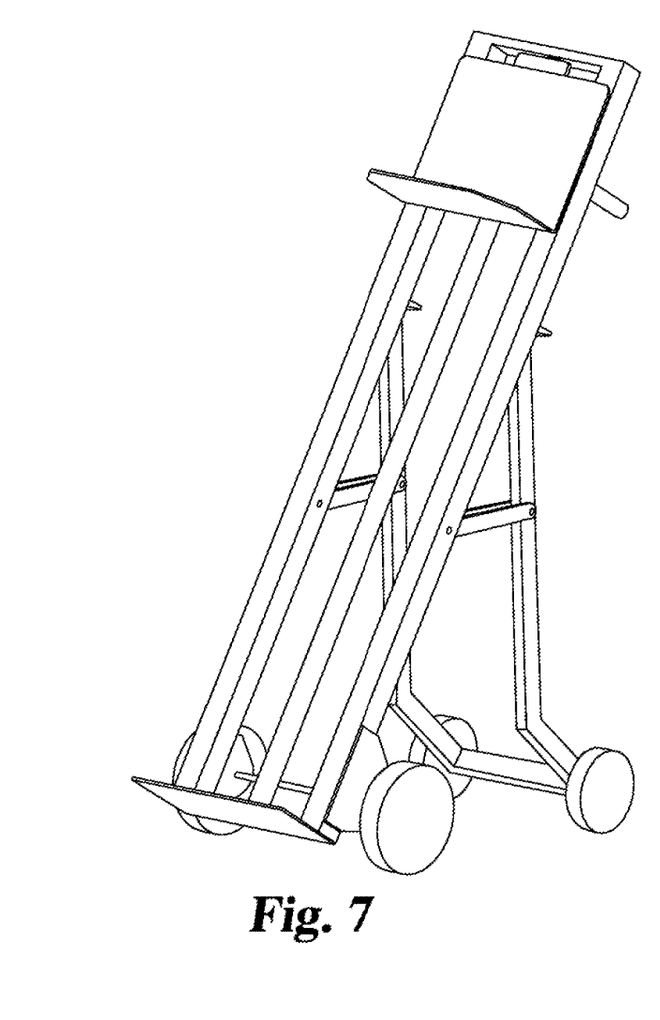

As will be appreciated by those of ordinary skill in the art, the battery pack(s) may attach to the battery pack mount(s) in any number of arrangements. For instance, the battery pack mount may be arranged to slidably receive the battery pack, as illustrated in FIGS. 4 and 5.

Alternatively or additionally, the battery pack mount may have a female/male portion configured to mate with a corresponding male/female portion of the battery pack.

The battery pack mount may be positioned on the motor assembly, such as on the motor housing. Alternatively, the battery pack mount may be positioned elsewhere on the handtruck, such as on the frame.

In many arrangements, the battery pack is one that is arranged to power a portable tool. For example, the battery pack may be one arranged to power a portable drill, impact driver and/or a portable outdoor tool. Examples include battery packs sold under the brand names DeWALT®, RIGID®, Black & Decker®, Milwaukee®, RYOBI®, PORTER CABLE®, HITACHI®, BOSCH®, MAKITA®, ROCKWELL®, and KOBALT®, just to name a few non-limiting examples.

In some arrangements, the motor assembly can be selectively combined with at least one batter pack mount of a plurality of different battery pack mounts. For example, the motor assembly may be configurable with a first battery pack mount arranged to receive a first battery pack and/or a second battery pack mount arranged to receive a second battery pack. The first and second battery pack mounts may be arranged to receive different brands of battery packs, different battery pack outputs (e.g., based on battery voltage and/or energy capacity), different battery pack compositions (e.g., NiCd, NiMH, and/or Lithium-ion), and/or different numbers of battery packs. Kits containing different battery pack mounts for use with a motor assembly are envisioned. The kits may include any of the motor assemblies and/or hand trucks described herein.

The hand trucks disclosed herein may include a rearward support configurable between an extended configuration and a retracted configuration. For example, turning now to FIGS. 8-14, hand trucks of this disclosure may include a rearward support 300. The rearward support is illustrated in the extended configuration in FIGS. 8-9 and in the retracted configuration in FIGS. 10-14. In many instances, the rearward support includes at least one downward extending support leg 302 having an upper portion 304 attached proximate the frame of the hand truck and a lower portion 306. The lower portion, in some arrangements, includes a wheel 308.

When in the extended configuration, the downward extending support leg 302 may extend in a direction transverse to a plane defined by the frame so as to position the lower portion of the downward extending support leg rearward of and spaced away from the first end of the frame. In the retracted configuration, the downward extending support leg can be in-plane with the frame and/or nested within a portion of the frame, such as within a groove 320 defined by a frame member. Additionally or alternatively, in the retracted configuration, the downward extending support leg, and/or the lower portion and/or wheels of the downward extending support leg can be positioned inward of and/or above a wheel coupled to the first end of the frame.

The rearward support can be pivotably coupled to the frame through an intermediate member 330. The intermediate member can have a first end 332 pivotably coupled to the frame and a second end 334 pivotably coupled to the rearward support. In illustrated embodiments, the second end of the intermediate member is coupled to an intermediate portion 340 of the downward extending support leg.

Figure 8:
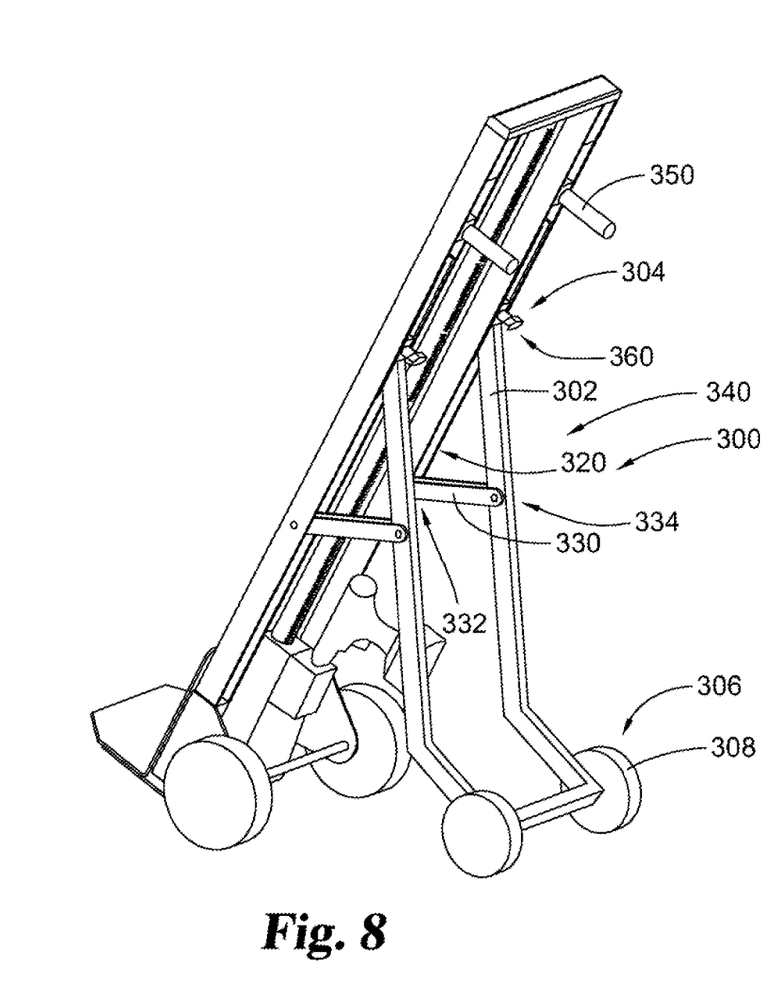
FIGS. 8 and 9 illustrate perspective views of a rearward support of the hand truck in an extended configuration.
Figure 10:
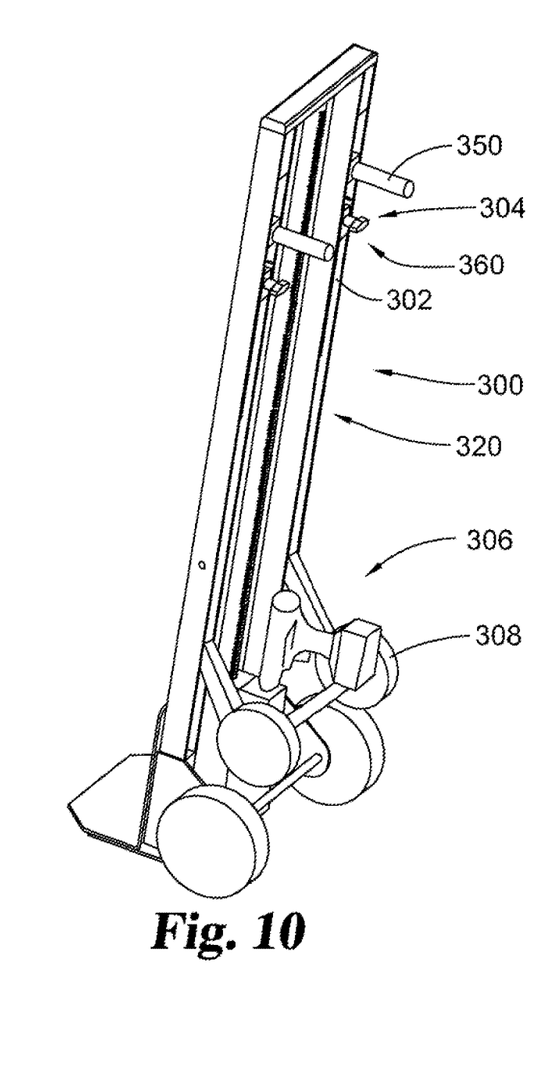
FIGS. 10, 11, 12, 13, and 14 illustrate a rearward support in a retracted configuration.
Figure 11:
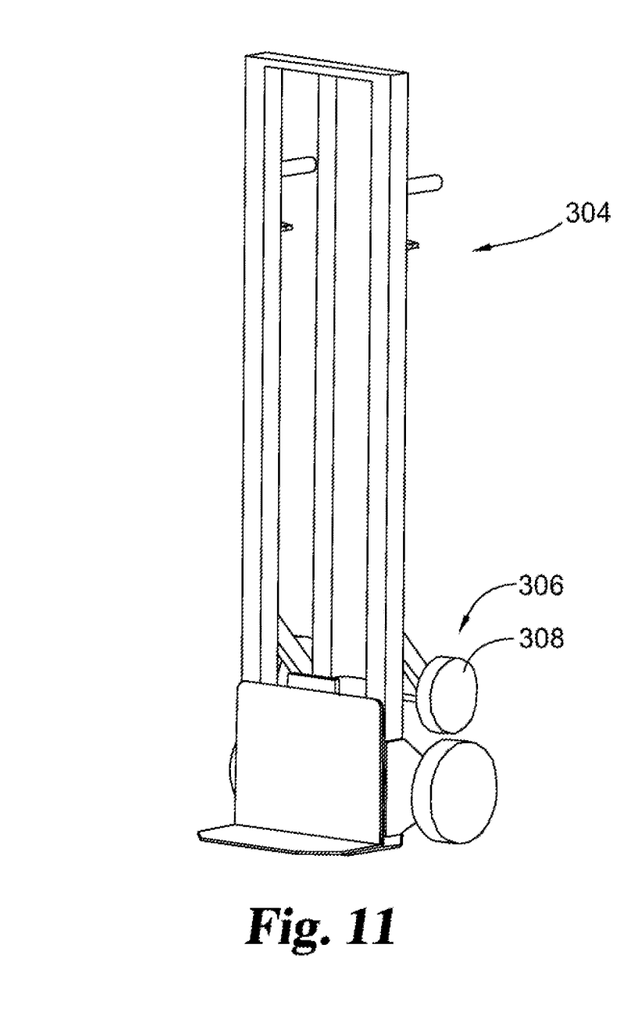
Figure 12:
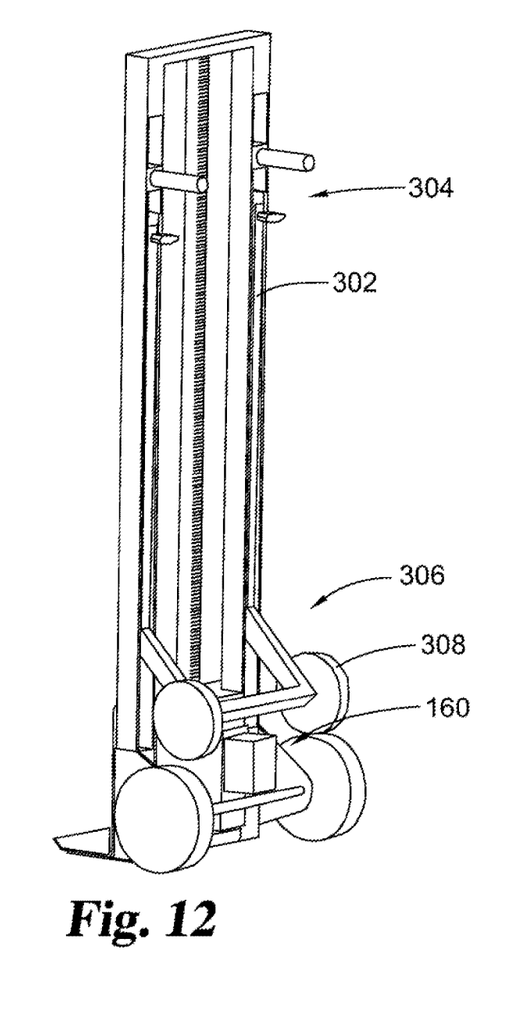
Figure 13:
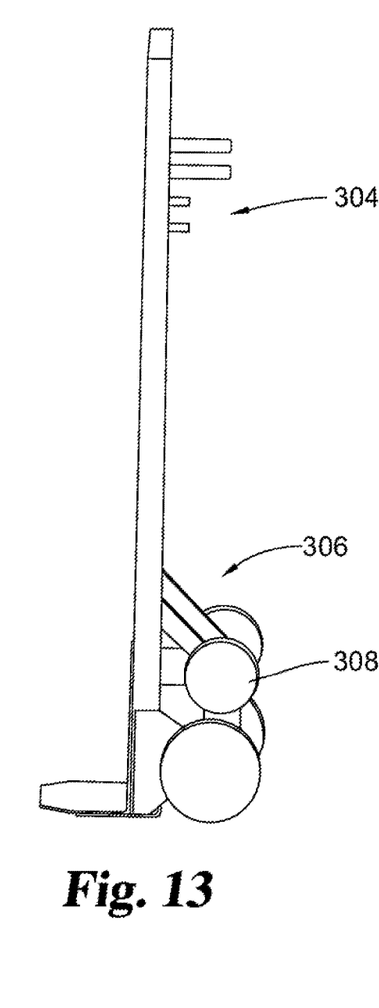
Figure 14:
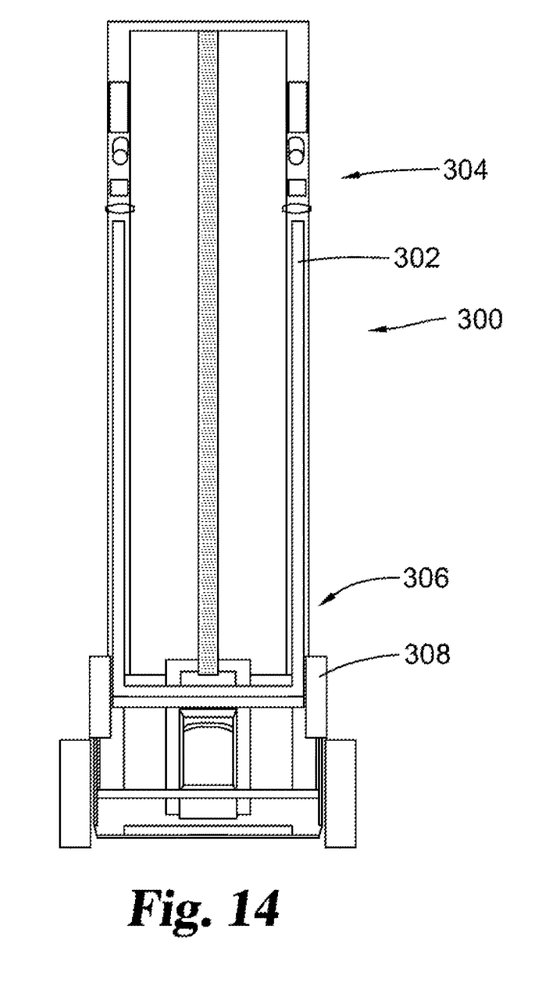

In embodiments having an intermediate member pivotably coupling a downward extending support leg to the frame, the upper portion of the downward extending support leg may be slidably and pivotably coupled to the frame so as to allow the upper portion to slide and pivot relative to the frame. For example, as illustrated in FIGS. 8 and 10, the upper portion 304 of the downward extending support leg is slidably positioned within the frame side member and slides and pivots relative to the frame when the rearward support is configured between the extended and retracted configurations. In some arrangements, the rearward support is securable in the extended and/or retracted configuration by a locking member 360 that slidably locks the rearward support relative to the frame.

Advantageously, by pivotably coupling the rearward support to the frame through an intermediate member, the rearward support member can pivot upwards as it moves into the retracted configuration. As can be seen in a comparison of FIGS. 8 and 10, the upper portion of the downward extending support leg 302 is closer to the handle 350 in the retracted configuration than in the extended configuration. This same pivoting movement can position the lower portion of the downward extending support leg higher above the first end of the frame of the handtruck than in an arrangement wherein the downward extending support leg is directly pivotably coupled to the frame. This can, as mentioned above, position the lower portion and/or wheels of the downward extending portion above a wheel coupled to the first end of the frame so as to reduce the overall dimensions of the hand truck in the retraced configuration. Such an arrangement can also be accomplished by having multiple intermediate members spaced along a length of the reward support and pivotably coupling the reward support to the frame so as to form a four-bar linkage.

Figure 9:
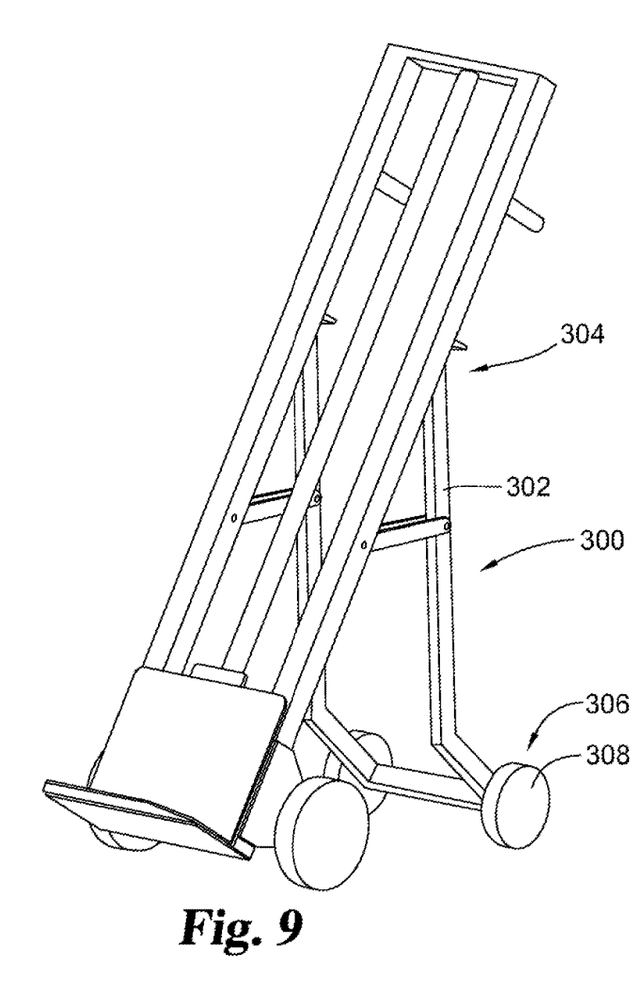

The rearward support arrangements disclosed herein may be used with a variety of different lifting assembly and/or motor assembly arrangements. For example, as shown in FIGS. 8-10, the rearward support may be included in hand trucks having a lifting assembly powered by an external motor and power source, such as a cordless drill. Alternatively, as shown in FIGS. 11-14, the rearward support may be included in hand trucks using a motor assembly with an detachable battery pack, as discussed above.

The language used in the claims and the written description is to only have its plain and ordinary meaning, except for terms explicitly defined below. Such plain and ordinary meaning is defined here as inclusive of all consistent dictionary definitions from the most recently published (on the filing date of this document) general purpose Merriam-Webster dictionary.

As used in the claims and the specification, the following terms have the following defined meanings:

The term "battery pack" as used herein means a housing containing any number of electrical batteries and/or battery cells. The batteries and/or battery cells can be configured in series, parallel or a mixture of both. The housings can contain any number of batteries and/or battery cells together with electronics. Such electronics may display, on the housing, the remaining energy of the batteries and/or control the charging and/or discharging of batteries and/or battery cells positioned within the housing. The battery and/or battery cell arrangements can have an output voltage of at least 12, 18, 20, or 24 volts. The battery and/or battery cell arrangements can be rechargeable batteries. The battery and/or battery cell arrangements can have lithion-ion, nickel cadmium, and nickel-metal-hydride compositions. Other battery chemistry and/or battery types, including future developed types, are included. The battery and/or battery cells arrangements can have rating of 1 amp hour or more, 3 amp hours or more, 6 amp hours or more, 10 amp hours or less, 20 amp hours or less, and/or 30 amp hours or less.

The term "elongated gearing system" as used herein means an elongated gear system having a drive wheel gear (in the form of a circular gear, pinion, bevel gear, spur gear, worm wheel, or otherwise (straight or spiral)) that can mesh with an elongaged gear with corresponding teeth, (e.g., a worm or worm gear or rack), spur gear, helical gear, and/or bevel gear) which translates rotary motion into linear motion along the elongated gear or of the elongated gear. Such motion may include direct movement of the drive wheel gear along the elongated gear, as well as indirect movement where the elongated gear, such as a worm, moves (e.g. rotates) and causes a follower to move along the elongated gear. Normally, the elongated gear is linear, but could include one or more curves. In the case of a worm, the motor may drive (rotate) the worm, causing a follower to travel up and down on it to move the lift.

The term "hand truck" as used herein may, in some instances, be referred to as a "dolly", "two wheeler", "stack truck", "trolley", "trundler", "box cart", "trolley truck", "sack barrow", "sack truck", or "bag barrow".

The term "motor assembly" as used herein means an electric motor and can include at least one of a simple machine (e.g., pulley, screw), a gear (e.g., spur, worm), a motor housing, and/or electronics to control motor direction and/or speed. The electric motor can be a rotational motor.

The term "portable tool" as used herein means a cordless, electric power tool and/or outdoor tool. Power tools include drills, impact drivers, saws, oscillating tools, grinders, staplers, and/or nailers. Outdoor tools include string trimmers, leaf blowers, hedge trimmers, chainsaws, and/or mowers.

The following numbered clauses set out specific embodiments that may be useful in understanding the present invention:

1. A hand truck, comprising:
   a frame having a first end and a second end;
   a wheel assembly attached to the first end of the frame and including at least two wheels;
   a lifting platform moveable along a length of the frame between the first end and the second end;
   a motor assembly arranged to move the lifting platform along the frame; and
   a battery pack mount arranged to removably receive a separate battery pack arranged for a portable tool and transfer power from the battery pack to the motor assembly.
2. The hand truck of clause 1, wherein:
   the battery pack mount is arranged to receive a battery pack adapted for a portable drill.
3. The hand truck of any preceding clause, and further comprising a battery pack adapted for a portable drill, wherein at least one of the battery pack and the battery pack mount has a latch arranged to engage the other of the battery pack and the battery pack mount, the latch configured to selectively lock the battery pack to the battery pack mount.
4. The hand truck of any preceding clause, wherein:
   the battery pack mount is positioned on the motor assembly.
5. The hand truck of any preceding clause, wherein:
   the motor assembly is coupled to the lifting platform and travels with the lifting platform when the lifting platform moves along the frame.
6. The hand truck of any preceding clause, comprising:
   an elongated gearing system extending at least partially between the first end of the frame and the second end of the frame;
   wherein the motor assembly engages to the elongated gearing system to move the lifting platform along the frame.
7. The hand truck of any preceding clause, wherein:
   the motor assembly includes a wireless communication module.
8. The hand truck of any preceding clause, further comprising:
   a rearward support configurable between an extended configuration and a retracted configuration and having a downward extending support leg; and
   an intermediate member extending from the frame to the rearward support member and having a first end pivotably coupled to the frame and a second end pivotably coupled to the rearward support.
9. The hand truck of clause 8, wherein:
   the downward extending support leg is nested within a portion of the frame in the retracted configuration.
10. A hand truck, comprising:
    a frame having a first end, a second end, a left frame member, a right frame member, and defining a plane;
    a wheel assembly attached to the first end of the frame;
    a lifting platform;
    a rearward support configurable between an extended configuration and a retracted configuration and having a downward extending support leg; and
    an intermediate member extending from the frame to the rearward support member and having a first end pivotably coupled to the frame and a second end pivotably coupled to the rearward support;
    wherein a upper portion of the downward extending support leg is slidable and pivotable relative to the frame.
11. The hand truck of clause 10, wherein:
    the downward extending support leg is in-plane with the frame in the retracted configuration.
12. The hand truck of clause 10 or 11, wherein:
    the downward extending support leg is nested within a portion of the frame in the retracted configuration.
13. The hand truck of any one of clauses 10-12, comprising:
    a locking member arranged to slidably lock the rearward support relative to the frame.
14. The hand truck of any one of clauses 10-13, wherein:
    the upper portion of the downward extending support leg is closer to the second end of the frame in the retracted configuration than in the extended configuration.
15. The hand truck of any one of clauses 10-13, comprising:
    a motor assembly arranged to move the lifting platform along the frame; and
    a battery pack mount arranged to removably receive a battery pack arranged for a portable tool and transfer power from the battery pack to the motor assembly.
16. The hand truck of clause 15, wherein:
    the battery pack mount is arranged to receive a battery pack adapted for a portable drill.
17. The hand truck of clause 15 or 16, and further comprising a battery pack adapted for a portable drill, wherein at least one of the battery pack and the battery pack mount has a latch arranged to engage the other of the battery pack and the battery pack mount, the latch configured to selectively lock the battery pack to the battery pack mount.
18. The hand truck of any one of clauses 15-17, wherein:
    the battery pack mount is positioned on the motor assembly.
19. The hand truck of any one of clauses 15-18, wherein:
    the motor assembly is coupled to the lifting platform and travels with the lifting platform when the lifting platform moves along the frame.
20. The hand truck of any one of clauses 15-19, comprising:
    an elongated gearing system extending at least partially between the first end of the frame and the second end of the frame;
    wherein the motor assembly engages to the elongated gearing system to move the lifting platform along the frame.
21. The hand truck of any one of clauses 15-20, wherein:
    the motor assembly includes a wireless communication module.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A hand truck, comprising:
a frame having a first end and a second end;
a wheel assembly attached to the first end of the frame and including at least two wheels;
a lifting platform moveable along a length of the frame between the first end and the second end;
a motor assembly arranged to move the lifting platform along the frame; and
a battery pack mount arranged to removably receive a separate battery pack arranged for a portable tool and transfer power from the battery pack to the motor assembly;
wherein the battery pack mount is not a portion of a hand drill; and
wherein the motor assembly is coupled to the lifting platform and travels with the lifting platform when the lifting platform moves along the frame.

2. The hand truck of claim 1, wherein:
the battery pack mount is arranged to receive a battery pack adapted for a portable drill.

3. The hand truck of claim 2, and further comprising a battery pack adapted for a portable drill, wherein at least one of the battery pack and the battery pack mount has a latch arranged to engage the other of the battery pack and the battery pack mount, the latch configured to selectively lock the battery pack to the battery pack mount.

4. The hand truck of claim 3, wherein:
the battery pack mount is positioned on the motor assembly.

5. A hand truck, comprising:
a frame having a first end and a second end;
a wheel assembly attached to the first end of the frame and including at least two wheels;
a lifting platform moveable along a length of the frame between the first end and the second end;
a motor assembly arranged to move the lifting platform along the frame;
a battery pack mount arranged to removably receive a separate battery pack arranged for a portable tool and transfer power from the battery pack to the motor assembly;
a battery pack adapted for a portable drill, wherein at least one of the battery pack and the battery pack mount has a latch arranged to engage the other of the battery pack and the battery pack mount, the latch configured to selectively lock the battery pack to the battery pack mount; and
an elongated gearing system extending at least partially between the first end of the frame and the second end of the frame;
wherein the battery pack mount is arranged to receive a battery pack adapted for a portable drill;
wherein the battery pack mount is positioned on the motor assembly;
wherein the motor assembly is coupled to the lifting platform and travels with the lifting platform when the lifting platform moves along the frame;
wherein the motor assembly engages to the elongated gearing system to move the lifting platform along the frame; and
wherein the motor assembly includes a wireless communication module.

6. The hand truck of claim 1, and further comprising a battery pack,
wherein at least one of the battery pack and the battery pack mount has a latch arranged to engage the other of the battery pack and the battery pack mount, the latch configured to selectively lock the battery pack to the battery pack mount.

7. The hand truck of claim 1, wherein:
the battery pack mount is positioned on the motor assembly.

8. The hand truck of claim 1, wherein:
the motor assembly is coupled to the lifting platform and travels with the lifting platform when the lifting platform moves along the frame.

9. The hand truck of claim 8, comprising:
an elongated gearing system extending at least partially between the first end of the frame and the second end of the frame;
wherein the motor assembly engages to the elongated gearing system to move the lifting platform along the frame.

10. The hand truck of claim 1, wherein:
the motor assembly includes a wireless communication module.

11. The hand truck of claim 1, further comprising:
a rearward support configurable between an extended configuration and a retracted configuration and having a downward extending support leg; and
an intermediate member extending from the frame to the rearward support member and having a first end pivotably coupled to the frame and a second end pivotably coupled to the rearward support.

12. The hand truck of claim 11, wherein:
the downward extending support leg is nested within a portion of the frame in the retracted configuration.

13. A hand truck, comprising:
a frame having a first end, a second end, a left frame member, a right frame member, and defining a plane;
a wheel assembly attached to the first end of the frame;
a lifting platform;
a rearward support configurable between an extended configuration and a retracted configuration and having a downward extending support leg; and
an intermediate member extending from the frame to the rearward support and having a first end pivotably coupled to the frame and a second end pivotably coupled to the rearward support;
wherein an upper portion of the downward extending support leg is pivotably attached to the frame such that a lower portion of the downward extending support leg pivots towards or away from the first end of the frame when the downward extending support leg is pivoted relative to the frame; and
wherein the upper portion of the downward extending support leg is closer to the second end of the frame in the retracted configuration than in the extended configuration.

14. The hand truck of claim 13, wherein:
the downward extending support leg is in-plane with the frame in the retracted configuration.

15. The hand truck of claim 13, wherein:
the downward extending support leg is nested within a portion of the frame in the retracted configuration.

16. The hand truck of claim 13, comprising:
a locking member arranged to slidably lock the rearward support relative to the frame.

17. The hand truck of claim 13, comprising:
a motor assembly arranged to move the lifting platform along the frame; and a battery pack mount arranged to removably receive a battery pack arranged for a portable tool and transfer power from the battery pack to the motor assembly.

18. The hand truck of claim 1, wherein:

the motor assembly includes a housing containing a motor; and wherein the housing provides counterforce to the motor during operation so that no mechanical force external of the hand truck acting on the motor assembly is required for the motor assembly to move the lifting platform.

\* \* \* \* \*